(12) United States Patent
Luckette et al.

(10) Patent No.: US 11,634,085 B2
(45) Date of Patent: Apr. 25, 2023

(54) TRUCK BED SYSTEM

(71) Applicants: Randy Luckette, Syracuse, NY (US); Donald R. Palumbo, Ashburn, VA (US)

(72) Inventors: Randy Luckette, Syracuse, NY (US); Donald R. Palumbo, Ashburn, VA (US)

( * ) Notice: Subject to any disclaimer, the term of this patent is extended or adjusted under 35 U.S.C. 154(b) by 0 days.

(21) Appl. No.: 17/580,620

(22) Filed: Jan. 20, 2022

(65) Prior Publication Data

US 2022/0227304 A1    Jul. 21, 2022

Related U.S. Application Data

(60) Provisional application No. 63/139,599, filed on Jan. 20, 2021.

(51) Int. Cl.
*B60R 9/06* (2006.01)
*B60R 11/00* (2006.01)

(52) U.S. Cl.
CPC .............. *B60R 9/065* (2013.01); *B60R 9/06* (2013.01); *B60R 2011/0084* (2013.01)

(58) Field of Classification Search
CPC .......................... B60R 9/06; B60R 2011/0084
See application file for complete search history.

(56) References Cited

U.S. PATENT DOCUMENTS

| | | | | |
|---|---|---|---|---|
| 5,988,722 A | * | 11/1999 | Parri | B60P 1/003 224/403 |
| 6,536,640 B1 | * | 3/2003 | Gent | B60R 9/00 224/403 |
| 6,752,301 B1 | * | 6/2004 | Drolet | B60P 3/40 224/403 |
| 9,745,002 B2 | * | 8/2017 | Eddings, Jr. | B62D 33/0207 |
| 10,279,750 B2 | * | 5/2019 | Lambert | B60R 9/06 |
| 10,300,963 B2 | * | 5/2019 | Puchkoff | B62D 33/0207 |
| 10,850,676 B1 | * | 12/2020 | Worker | B60P 7/15 |

(Continued)

*Primary Examiner* — Justin M Larson
(74) *Attorney, Agent, or Firm* — Attentive Law Group, PLLC; Paul Ratcliffe

(57) ABSTRACT

The present invention provides an easy and quick assembled and removable rack system which can have the length and width of the system adjusted. The rack system can be assembled in numerous configurations to carry various load sizes and objects. The inventive rack system includes an expandable front brace, an expandable left and right-side frame, an expandable rear brace, expandable left and right support rails, where the expandable support rails have an inner opening for receiving an inner support rail for added support when the left and right support rails are extended. The inner support rails also have an inner opening for receiving a left and right extension arm which fits inside the inner rail opening and the extension arms can be extended from the rear of the frame for added length and support when carrying longer items of for pulling out a portion of the deck panels to create a work surface area off the back of the truck or rack system. The support rails are configured to support removeable panels for providing a deck. The deck is formed from a plurality of expandable deck panels which can have the widths or length adjusted to accommodate the vehicle size. The deck panels are received by the top edge on the left and right support rails.

17 Claims, 11 Drawing Sheets

(56) References Cited

U.S. PATENT DOCUMENTS

| | | | |
|---|---|---|---|
| 11,279,420 B2* | 3/2022 | Kananda | B62D 33/0207 |
| 11,292,532 B1* | 4/2022 | Heinzelman | B60R 5/041 |
| 2006/0237503 A1* | 10/2006 | Langelier | B60P 3/14 |
| | | | 224/403 |
| 2015/0034688 A1* | 2/2015 | Fisher | B60R 9/06 |
| | | | 224/404 |
| 2016/0001825 A1* | 1/2016 | Manlick | B60R 13/01 |
| | | | 224/403 |
| 2016/0167591 A1* | 6/2016 | Salinas | B60R 9/06 |
| | | | 224/404 |
| 2022/0009562 A1* | 1/2022 | Mannone | B62D 33/0207 |
| 2022/0227304 A1* | 7/2022 | Luckette | B60R 9/065 |

* cited by examiner

TRUCK BED SYSTEM

RELATED APPLICATION

This application claims priority to U.S. Provisional Application 63/139,599 filed on Jan. 20, 2021, entitled "Truck Bed System", the entirety of which is incorporated herein.

BACKGROUND OF THE INVENTION

The present invention relates to a vehicle rack and organizer devices, and more particularly pertains to a removable and expandable vehicle platform, rack, and organizer (the "REVPRO") system for providing a compact, easily assembled, and easily disassembled rack with a platform for a vehicle or trailer. The REVPRO system is ideally suited for the bed of a pick-up truck but could be used in a van, trailer, and other types of hauling and storage vehicles.

Known vehicle rack and organizer systems or devices are often used to enhance the functionality of a vehicle allowing owners to carry construction materials, supplies, and objects. These rack systems are oftentimes used in the truck bed of trucks. Truck beds and vehicle space, such as a box truck, have varying sizes. These known or previous vehicle rack and organizer systems have deficiencies in their ability to be easily assembled, easily removed, expandable to fit various sizes in width and length, and create numerous configurations and levels to carry varying sizes of loads or objects.

SUMMARY OF THE INVENTION

The present invention REVPRO system overcomes these problems by providing a truck bed system which can be easily assembled, is easily removable, can expand in both length and width, and can be assembled in numerous configurations to carry various sizes of loads and objects to be carried by the rack system of the present invention.

The REVPRO system provides an inventive device which includes an expandable front brace, an expandable left and right-side frame, an expandable rear brace, expandable left and right support rails, where the left and right support rails each have an inner opening for receiving an inner expander support rail where the left and right inner expander support rail has an inner opening for receiving a corresponding left and right extension arm, and a lower ledge for supporting a deck where the deck is formed from a plurality of expandable deck panels for configuring varying widths or lengths of the panels. The deck panels are received by the lower ledge on the left and right support rails.

The REVPRO system is easily expandable both in length, width, and height by adjusting the length of the front and rear brace to accommodate the width required, the length of the left and right support frames to accommodate the length required, the length of the left and right support rails, the length of the expandable deck panels, and the height of the left and right support frames. The height adjustment is an adjustment of the height of the deck which is adjusted by placement or adjustment of the height of the left and right support rails when attached to the left and right support frame. The variable height of the deck or deck panels helps to optimize the unused vertical space, or improve the efficient use of, in the volume of the truck's bed by creating a second bed floor (the deck) to carry objects while storing or stacking flatter material or other low height objects on the truck bed's floor (below the deck). The design of the left and right support frames, with a designed gap between the two front legs and two rear legs, and leg connection bars, allows them to easily fit over the top of the varying wheel well sizes of different trust beds to maximize the width of the unit within the truck bed and accommodate a large variance of truck bed designs.

The REVPRO system is also easily and quickly assembled for installation and easily disassembled for removal. The front and rear brace or support assembly is mechanically attached to the left and right support frames using a mechanical clasp and clip, the left support rail is attached using a mechanical clasp and clip to the left support frame and the right support frame is attached using a mechanical clasp and clip to the right support frame, and the extendible deck boards are attached to left and right support rails to form a deck.

The REVPRO system further comprises a plurality of accessories and improvements including: an optional rear deck panel having a rear vertical stop; tie down features on the support frames; extension arms; a front deck box; left and right front side boxes; left and right rear side boxes, and a rear deck box which may be a top mounted rear deck box or an under deck mounted box.

The REVPRO system is also highly configurable both in length, width, and height. The deck may be installed or removed (or not installed). The deck may be built as a partial deck not covering the entire length of the support rails by installing the desired amount of extendible deck boards. The deck may be installed at various heights on the frame by moving the height of the support rails on the left and right support frames. The REVPRO system may also include a plurality of storage boxes which may be installed in various locations on the frames, support rails, or deck of the present invention.

These together with other objects of the invention, along with the various features of novelty which characterize the invention, are more fully described in the detailed description and depicted in the Figures. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The following detailed description of the invention is better understood when read with reference to the drawings in which.

DETAILED DESCRIPTION

Hereinafter, aspects of the parts, elements, and associated system in accordance with various embodiments of the invention will be described. As used herein, any term in the singular (i.e., deck panel) may be interpreted to be in the plural (i.e., deck panels), and alternatively, any term in the plural may be interpreted to be in the singular. It is appreciated that features of one embodiment as described herein may be used in conjunction with other embodiments. The present invention can be more fully understood by reading the following detailed description together with the accompanying drawings (FIGS. 1-11), in which like reference indicators are used to designate like elements.

Figure 1:
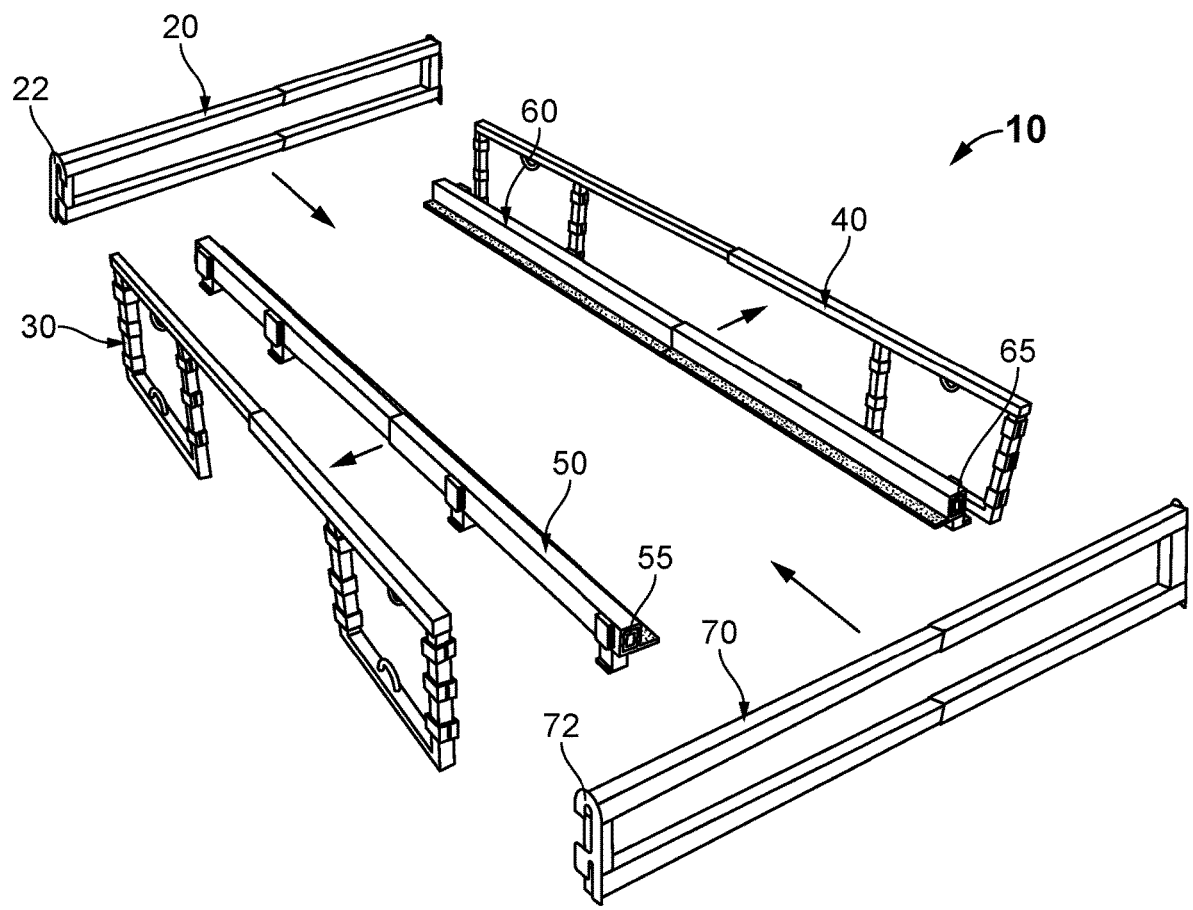
FIG. 1 provides a perspective breakout view of a preferred embodiment of the present invention.

As seen in FIG. 1, a preferred embodiment of the present invention provides a truck bed frame system 10 which includes a front brace 20, a left side frame 30, a right-side frame 40, a left deck support rail 50, a right-side deck support rail 60, and rear brace 70.

The left side frame 30 and right-side frame 40 connect to the front brace 20 using a double "J" hook 22 located on each end of the front brace 20 with each clip or tongue of the double "J" hook 22 slotting into a gap or opening (see 37 on FIG. 9A) in two double mechanical clasps (see 33, 34 on FIG. 9A) located on the rear leg (see 31 on FIG. 9B) of the left and right side frames 30, 40. In a preferred embodiment, each leg or riser 31 of the side frames 30, 40 have four—double mechanical clasps 33, 34 equally spaced apart from each other on the leg 31. FIG. 1 shows each leg 31 with three double mechanical clasps. The spaced mechanical clasps 33, 34 allow the front brace 20 to be attached to the left and right-side frame 30, 40 in an upper, middle or lower position. The deck support rail 50 attaches to the left side frame 30 and a deck support rail 60 attaches to the right-side frame 40.

When assembled, the truck bed rack system 10 provides a rigid frame for inserting into a truck bed or into other vehicles such as a box truck or cargo van. The left side frame 30 and right-side frame 40 have front and rear support structures with an opening between the structures allowing the left side frame 30 to fit over the left wheel well and the right-side frame 40 has an opening to fit over the right-side wheel well in the truck bed. The left side frame 30 and the right-side frame 40 are extendable allowing the left side frame 30 and the right-side frame 40 to extend to the appropriate length of the truck bed. The left side frame 30 and right-side frame 40 each have two sections or halves with one section (i.e., the front half) having a slightly smaller outer dimension top rail which fits inside the hollow space of the top rail of the other half (i.e., the rear half).

The front brace 20 and rear brace 70 are also extendable allowing it to expand to the appropriate width of the truck bed within which the system 10 is being installed. The left deck support rail 50 and the right deck support rail 60 are also extendable to match the length of the truck bed and the length of the left side frame 30 and right-side frame 40. The extension of the support rails 50, 60 is accomplished with the outer square tubular bar having a left and right section with the bar having a hollow center. A second or inner square tubular stabilizer rail or bar has a smaller outer width and height, but similar length fits inside the hollow center of the outer support rail. The left and right halves of the outer support rail can be pulled away from each other to increase the length or pushed towards each other to decrease the length of the support rail. The inner expander support rail provides support to the left and right sections of the rails 50, 60 when extended. The left and right inner expander support rails each have an inner opening for receiving a corresponding left and right extension arm.

Figure 2:
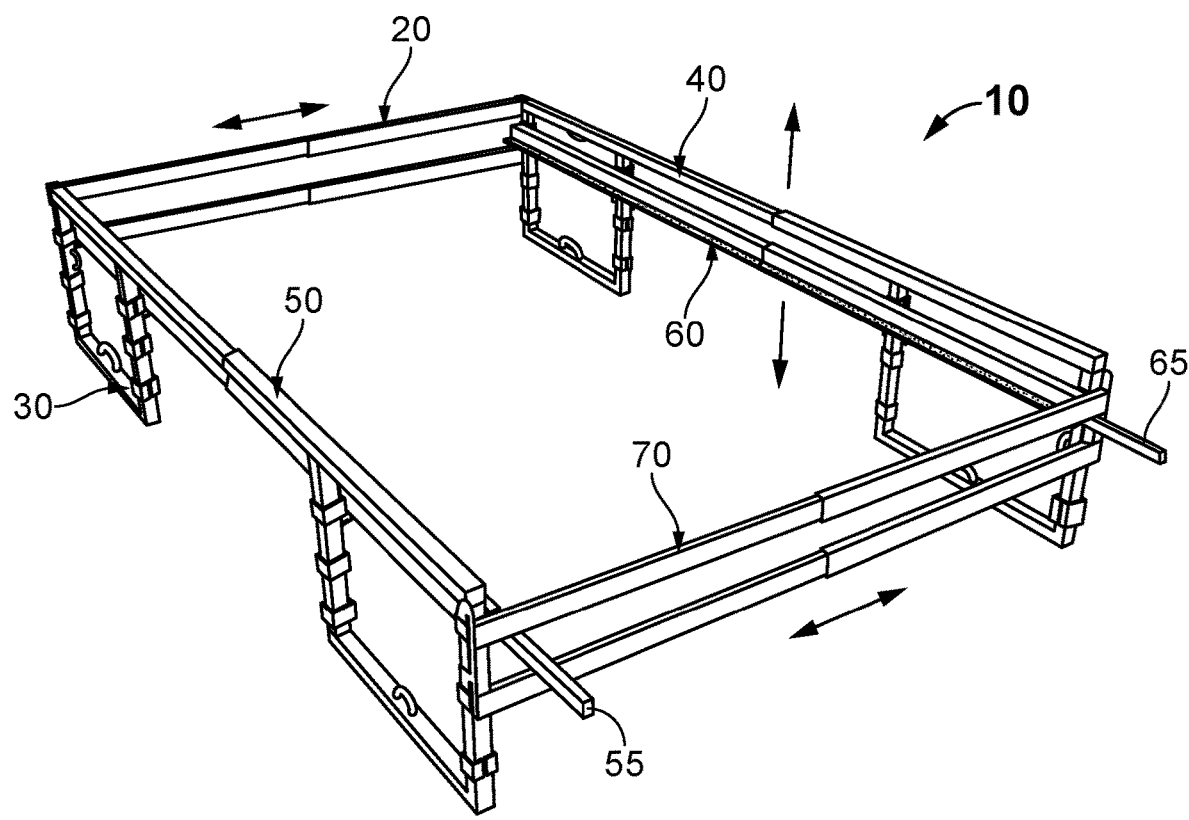
FIG. 2 provides a perspective view of a preferred embodiment of the present invention with the extension arms in an extended position.

As seen in FIG. 2, the extendable front brace 20 and extendable rear brace 70 attach to opposite ends of the side frames 30, 40 with the double J hook 22, 72 sliding into one or more clasps 33, 34 located on the legs 31 of the side frames 30, 40. Once the front and rear brace 20, 70 are attached to the frames 30, 40 the system can be adjusted to fit the desired space of the truck bed or vehicle space. The deck support rails 50, 60 are then extended to match the length of the side frames 30, 40 and attached to the side frames. In the preferred embodiment, the rails 50, 60 are attached using a clip 64 (see FIGS. 10 A and 10B) which is inserted into the space 37, 38 (see FIG. 9A) provided by clasp 33, 34. Once the support rails 50, 60 are attached the frame of the system 10 is in place, rigid and ready to support the deck boards or panels.

The deck support rail 50 and deck support rail 60 can be mounted at various height locations on side frame 30 and side frame 40 to allow the user to position the deck (as described in more detail below) to their desired height. This vertical placement of the support rails 50, 60 is handled by moving the support rails up or down so that the clips 64 are inserted into the various pocket clamps 33, 34 on each leg 31 of the side frame 30, 40. The pocket or pocket clamps or clasps 33, 34 are referred to herein as clamps. Also as seen in FIG. 2, the support rails 50, 60 have longitudinal openings 67 (see FIG. 7A) inside the rails which receive an inner expander support rail (not shown) for support when the support rails are expanded. The left and right inner expander support rail has an inner opening for receiving a corresponding left side extension arm 55 and a right-side extension arm 65. In addition, the side frame 30 and side frame 40 can have tie-downs or other elements integrated which can be used to secure loads or other materials to the truck bed rack system 10.

Figure 3:
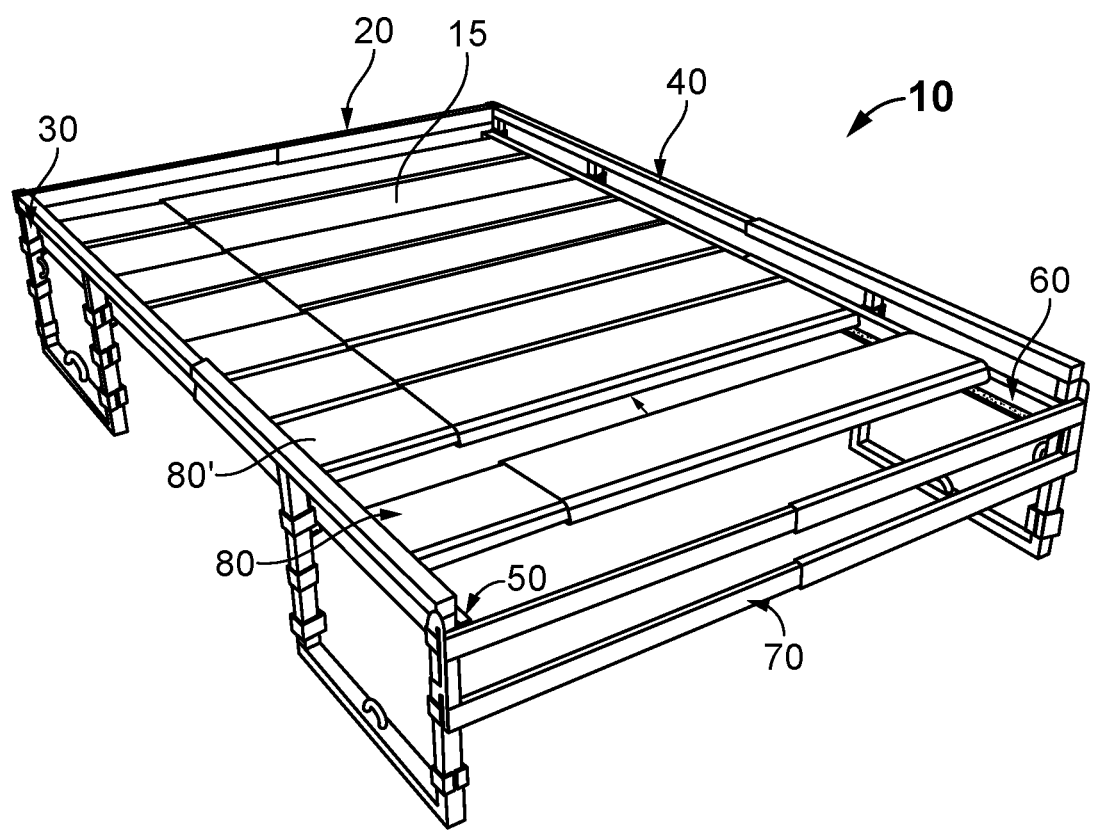
FIG. 3 provides a perspective view of a preferred embodiment of the present invention with the deck partially installed.

As seen in FIG. 3, the support rails 50, 60 can accommodate a plurality of extendable deck panels 80, 80'. In the preferred embodiment, the support rails 50, 60 have a lower ledge 68 (see FIG. 7A) which the ends of the panels or deck boards 80, 80' rest on. A hook and loop material can be applied to the top surface of the ledge 68 and the mating hook and loop material can be applied to the bottom edge of the deck boards 80, 80' to fix the deck boards 80, 80's to the ledge 68 of the rails 50, 60 and prevent the deck boards 80, 80' from moving. The extendable deck boards or panels 80, 80' can extend to the appropriate width of the truck bed system 10. Numerous deck panels 80, 80' can be set adjacent to each other along the support rail lower edge 68 to build or assemble a completed deck or platform 15.

Figure 4:
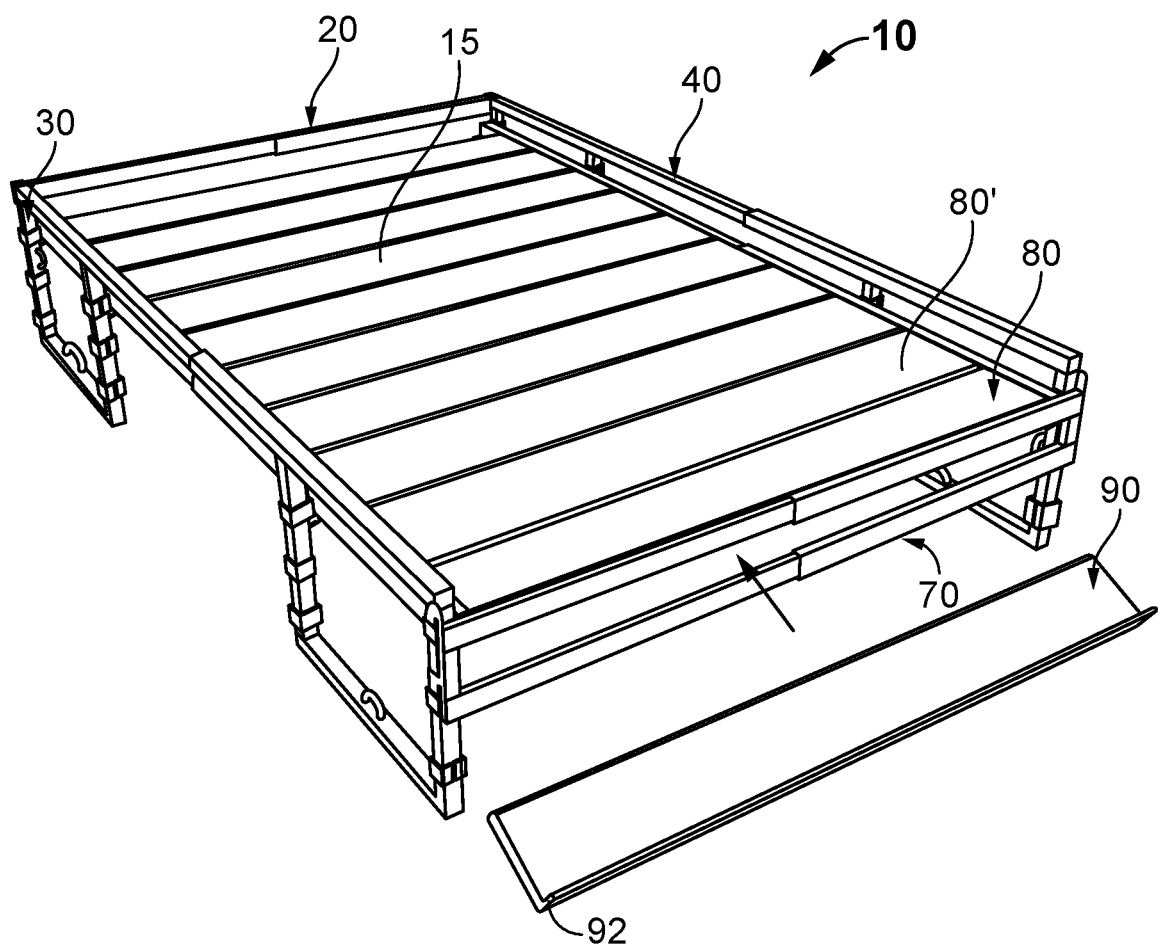
FIG. 4 provides a perspective view of a preferred embodiment of the present invention showing an optional rear deck panel with a raised stop.

The rear brace 70 may also be attached at a higher height than the rails 50, 60 so that the rear brace 70 acts as a stop or wall to prevent any payload from falling off the back of the platform 15. An alternative embodiment, as depicted in FIG. 4, could include an end deck panel 90 which may include a deck panel vertical stop 92. The vertical stop 92 is not required but the present invention may employ such stop which is useful for preventing any materials loaded onto the deck from sliding off of the deck 15. The end deck panel 90 would be set adjacent to the other panels using the hook and loop material but could also mechanically attach to the rails 50, 60 of the rear brace 70.

The extension rods 55, 65 (as seen in FIG. 2) fit within their corresponding opening of the extender support rails (not shown) and the extender support rails which fit within the opening 67 of the deck support rail 50, 60. The extension rods 55, 65 may be fully inserted into the openings 67 or the extension rods 55, 65 may be pulled out to provide for an extended deck or platform 15 for carrying longer materials such as drywall or plywood sheathing which may be longer than the length of the truck bed system 10 or even the length of the truck bed. The extension arms 55, 65 when inserted into the openings 57, 67 may be locked into a closed position such that the extension arms do not come out during driving or do not come out until unlocked by the user.

Figure 5:
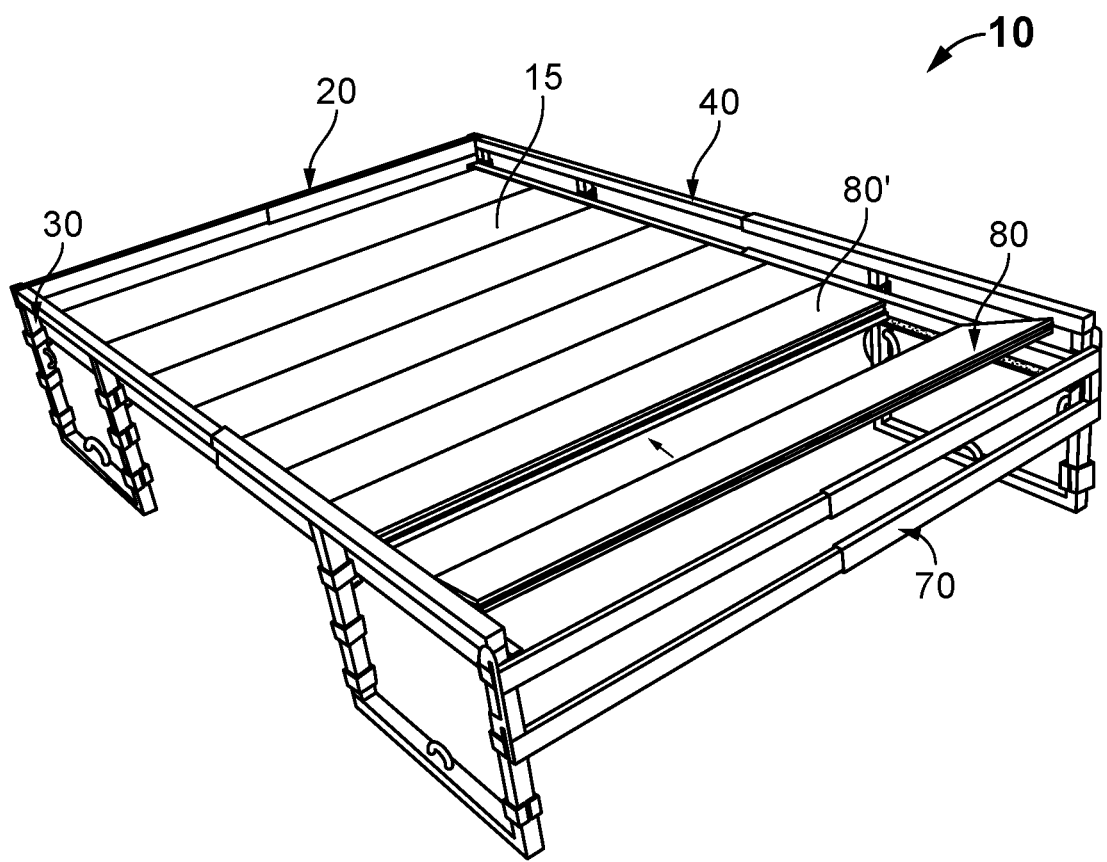
FIG. 5 provides a perspective view of a preferred embodiment of the present invention using tongue and groove deck panels.

As seen in FIG. 5, the deck panels 80, 80' may employ an alternative fastening mechanism such as a tongue and groove connection mechanism. A first long edge of the deck panel 80, 80' may include a tongue portion with the mating long edge of the adjacent panel 80, 80' including a groove portion. In this way, the deck 15 would allow for easy connections of the panel pieces 80, 80' so that the deck 15 becomes an integral piece which can be moved to the any position along the rails 50, 60. The tongue portion and groove portion could be positioned on the front edge or the rear edge of the deck panel 80, 80'.

Figure 6A:
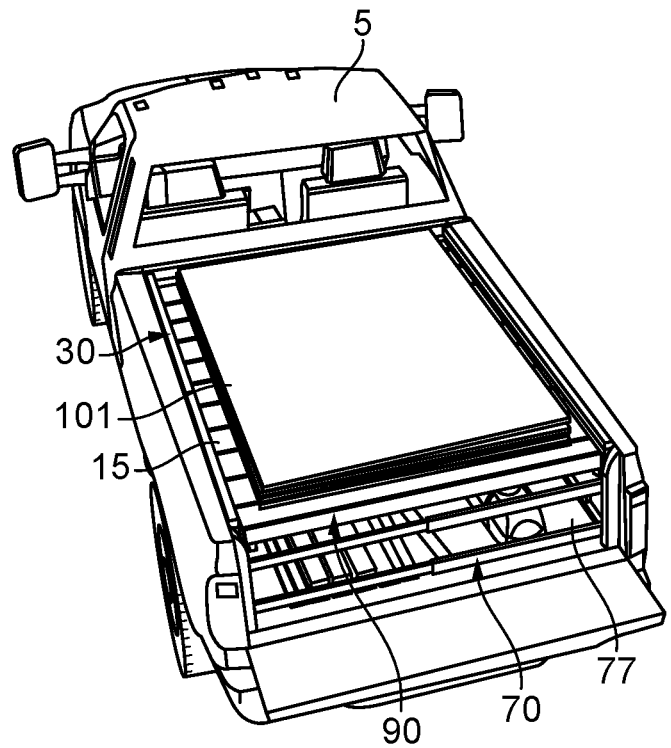
FIG. 6A provides a perspective view of a preferred embodiment of the present invention installed with a full deck configuration in the bed of a pickup truck.

FIG. 6A provides an illustration of a truck 5 which shows the REVPRO truck bed system 10 constructed within the bed of the truck 5. The REVPRO system 10 in FIG. 6A includes the front brace 20, the left side frame 30, the right-side frame 40, the rear brace 70, the side rails 50, 60, and the deck boards 80, 80' with a full deck 15 running the length of the truck 5 bed. As seen in FIG. 6A, the truck bed system 10 shows the deck 15 constructed with the deck 15 height approximately located near the upper edge of the truck bed. The height of the deck 15 provides an opening 77 between the truck bed and the deck 15. By having the deck 15 in a raised position in the truck bed system 10, the user can store smaller materials in the opening 77 created by the deck panel 15 and the truck bed. Therefore, the user can place larger construction materials, such as drywall and plywood sheathing, on the top of the deck 15 and put the smaller items such as 2×4 or other dimension lumber, tools and other materials into the lower opening 77 or vice versa.

Figure 6B:
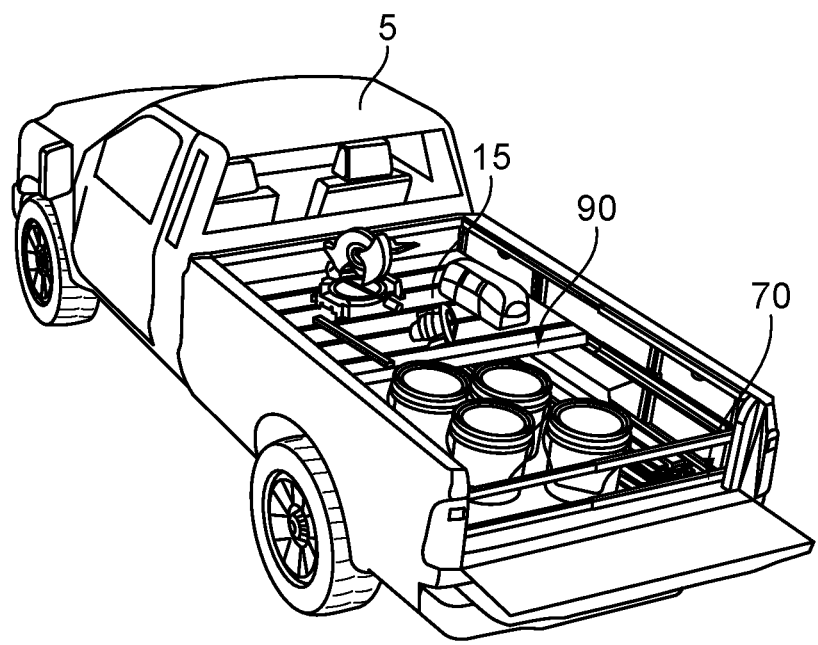
FIG. 6B provides a perspective view of a preferred embodiment of the present invention installed with a partial deck configuration in the bed of a pickup truck.

As seen in FIG. 6B, the fewer deck boards 80, 80' of truck bed rack system 10 can be used to form a partial platform or deck 15. A partial deck 15 configuration allows the rear portion of the truck bed to be open for transporting taller items such as 5-gallon buckets or larger tools. However, the partial deck 15 can also carry various tools and materials. The rear brace 70 can also act as a stop preventing materials from moving past the truck bed rack system 10. Ultimately, the user can determine the length or size of the platform 15 needed for the materials and equipment the user needs to transport.

Figure 7A:
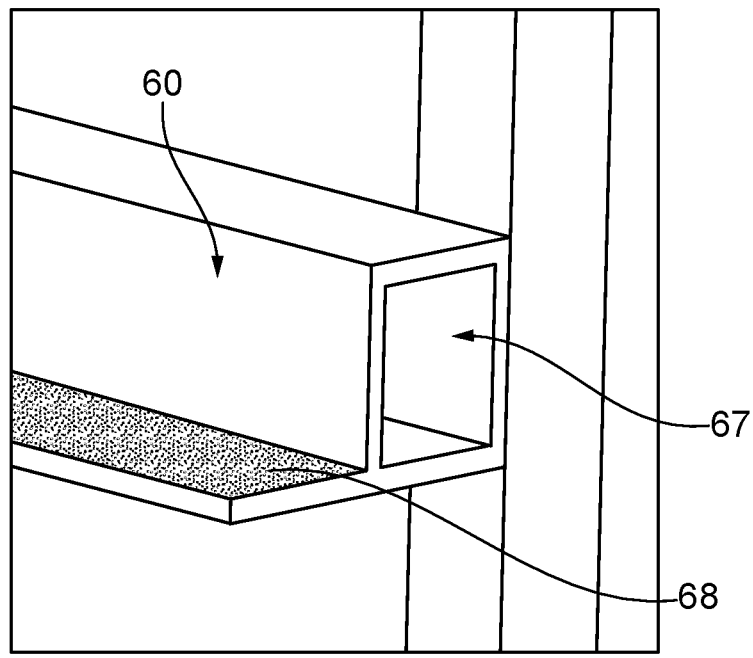
FIG. 7A provides a perspective view of a cross section of the support rail with a hollow opening for receiving an inner expander support rail where inner expander support rail has an inner opening for receiving a corresponding extension arm, and a lower ledge for receiving an end of the extendible deck board.

FIG. 7A depicts a partial view of the support rail 60. In the preferred embodiment, the rail 60 is constructed of a square tubular rail with a lower ledge 68 extending lengthwise along the rail 60. As mentioned previously, the lower ledge 68 may have a hook and loop material running along the top surface of the ledge 68. The support rail 60 also has an opening 67 for receiving the inner extender support rail (not shown). The inner extender support rail has a similar opening for receiving the extension arm 65. The opposite side support rail 50 would have the same or a similar design.

Figure 7B:
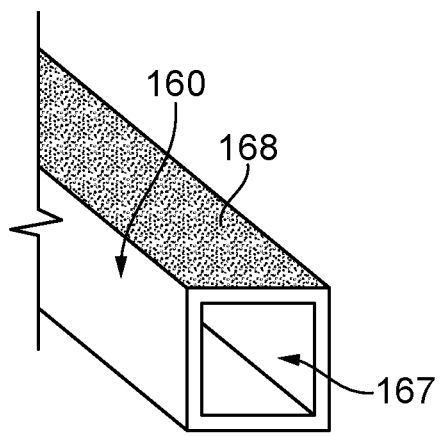
FIG. 7B provides a perspective view of a cross section of an alternative design of the support rail with a hollow opening for receiving an inner expander support rail where the inner expander support rail has an inner opening for receiving an extension arm where the support rail has an upper surface for receiving an end of the extendible deck board.

An alternative rail design is depicted in FIG. 7B which shows the alternative support rail 160 without a lower ledge. Instead, the top surface of the rail 168 would be used to mate with the ends of the deck boards 80, 80'. The alternative rail 160 would also have an opening 167 for receiving an inner support rail (not shown). The inner support rail has a similar opening for receiving the extension arm 65.

Figure 8:
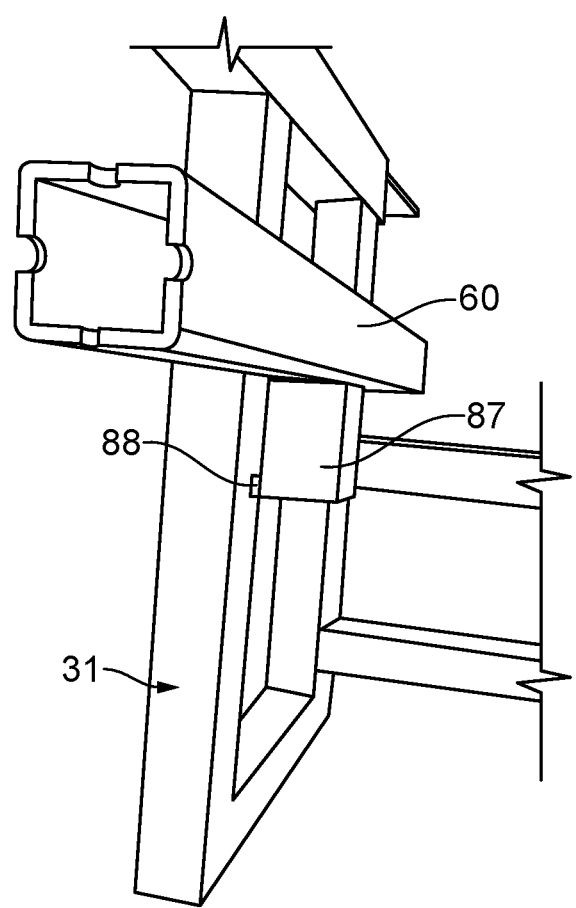
FIG. 8 provides a perspective view of the left side frame member with the support rail installed.

FIGS. 8 provides a cut away perspective view of the side support rail 60 installed on the legs 31 of the side frame 30. As will further be described in FIGS. 9A, 9B, 10A, and 10B, the clip 64 is inserted into the opening 37 of the clamp or clasp 33, 34. The rails 50, 60 may also incorporate a stabilizer comprised of a stabilizer arm 87 with a stabilizer extension 88. The stabilizer would allow the extension 88 to mate with the leg 31 of the side frame 31 to support the rails 50, 60 from moving and rattling. As seen in FIG. 10A, the stabilizer would be located below the clip 64 so that it aligns with the legs 31 of the side frames 30, 40. Further, as seen in FIG. 10A, the clip 64 is the front part of a "U" shaped a rail attachment 63. In the preferred embodiment, the rail attachment 63 is welded to the rail 60. However, in an alternative embodiment, the attachment 63 could be mechanically fastened to the rail 60 using a bolt and nut or other logical fastening mechanism.

Figure 9A:
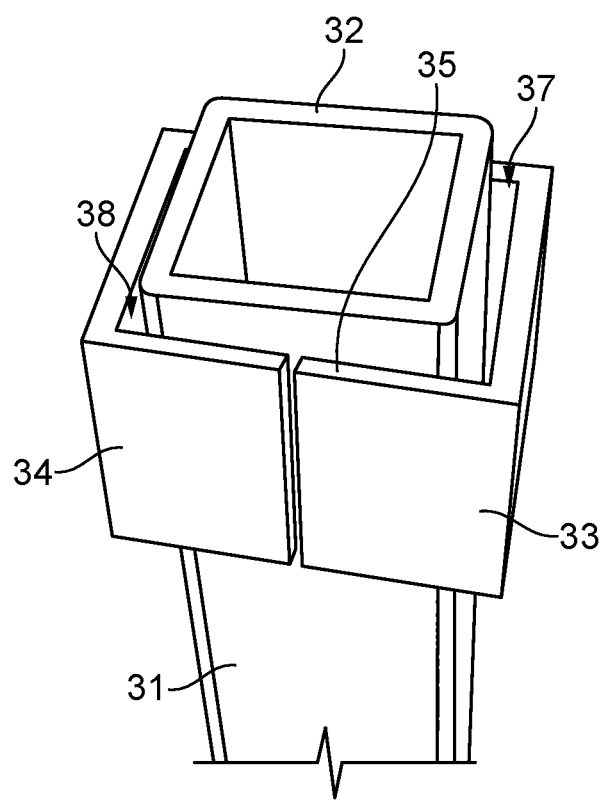
FIG. 9A provides a perspective view of a vertical leg of the frame member with the support rail receiving clamp.
Figure 10A:
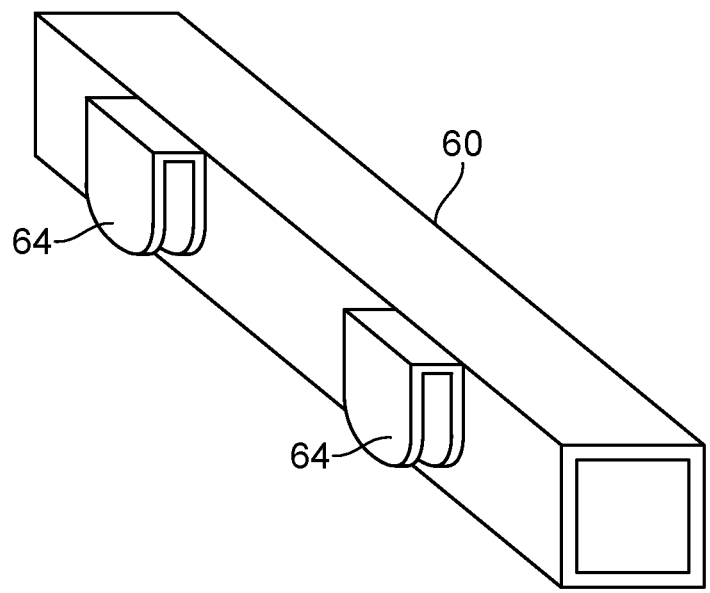
FIG. 10A provides a perspective view of a cross section of the support rail showing the "L" shaped tongue clamp for mating with the support rail clamping member.

As seen in FIG. 9A, the clamp or clasp 33, 34 is configured as a double clamp with a right clamp 33 and left clamp 34 (or interior and exterior). The right clamp 33 is attached to the leg 31 by welding 35 or using a mechanical fastener in a position which provides an opening 37 between the leg 31 surface and the clamp. The left clamp 34 is also attached to the leg 31 by welding or a mechanical fastener in a position which provides an opening 38. The openings 37, 38 are for receiving the clip 64 on the support rails 50. 60.

Figure 9B:
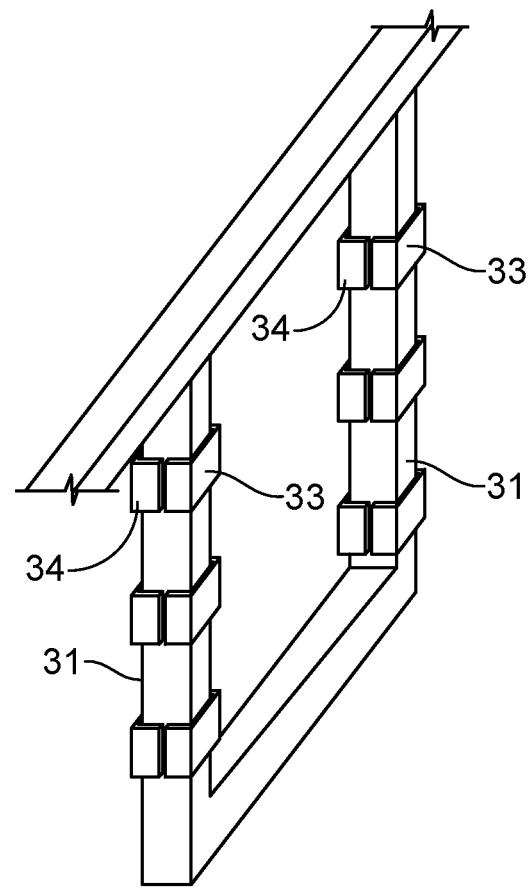
FIG. 9B provides a perspective view of a portion of a frame member with the support rail clamping member on more than one vertical leg.

As seen in FIG. 9B, multiple clamps 33, 34 are fixed to the legs 31 of the side frames 30, 40 at different heights allowing the support rails 50, 60 to be moved to the user's desired height along the support frames 30, 40. The clamps 33, 34 are also used to attach the front and rear support rails 20, 70, and to attach accessories as described below in conjunction with FIG. 11.

Figure 10B:
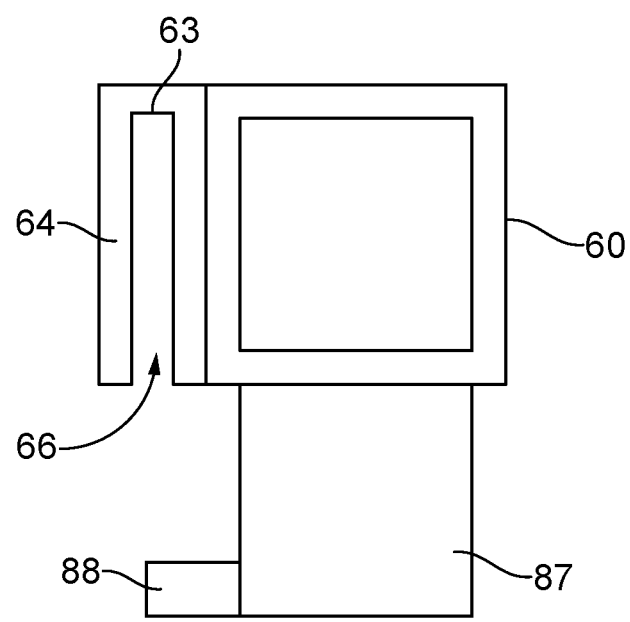
FIG. 10B shows a cross section view of the support rail with a "U" shaped attachment with the inner arm connected to the support rail and the outer arm used as a clip for attaching the support rail to the frame, and a stabilizer attached below the support rail for additional support.

As seen in FIG. 10A and 10B, the support rail 60 include one or more clips 64 which mate or are inserted into the openings 37, 38 of the side frames 20, 30. In a preferred embodiment, the clips 64 have a rounded lower edge to allow for easier insertion into the openings 37, 38 of the clamps 33, 34. As previously described, the support rails 50, 60 may include a stabilizer attachment with an extension arm 87 and stabilizer extension 88. The stabilizer extension 88 may be made of metal or an alloy which is welded to the arm 87 (or made as one integral piece) or may be made of a rubber to provide vibration or sound absorption characteristics. The extension 88 may be a combination of a metal piece and rubber materials.

Figure 11:
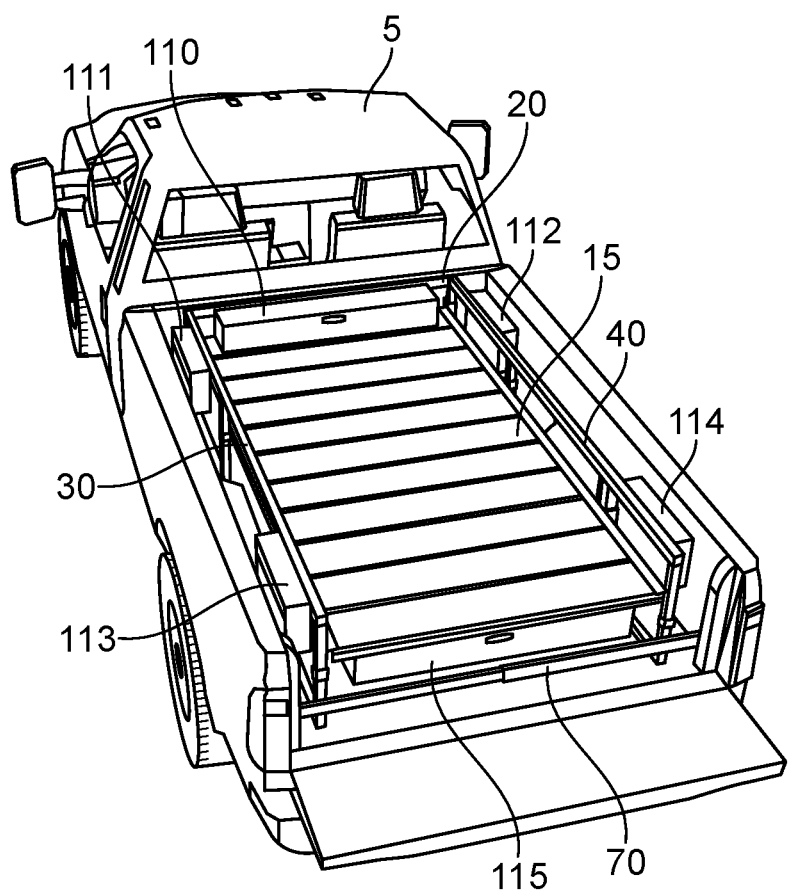
FIG. 11 shows a perspective view of a vehicle with the system of the present invention installed with attachable accessory storage boxes.

As seen in FIG. 11, the truck bed system 10 can also employ various accessories to enhance the organizational aspects of the present invention. These accessories can include a front center storage box 110, a front left storage box 111, a front right storage box 112, a left rear storage box 113, and a right rear storage box 114. In addition, there can be a rear storage box 115 which is attached to the lower side or the top side of the rear deck panel 90. The various storage boxes 110, 111, 112, 113, 114 can be affixed to the rack system 10 through various mechanical fastening mechanisms including one or more clips 64 (see FIG. 10A) on the back side of the boxes 110, 111, 112, 113, 114 which mate with the outer clamp 38 on the left or right frame 30, 40, a button and keyhole configuration, or openings on the frame for accepting a bolt/nut or a cotter pin. The storage boxes 110, 111, 112, 113, 114 could also be locked to the truck bed system 10 and can also have their own locking mechanisms to secure the user's items within each storage box. The storage boxes 110, 111, 112, 113, 114 allow the user to store tools or supplies in an organized fashion. The doors or openings of these storage boxes 110, 111, 112, 113, 114, depending on their location on the REVPRO system may have a top side lid or a front opening panel that drops down or rotates up to allow access to the contents stored within each storage box 110, 111, 112, 113, 114.

The system 10 can also include a deck sliding assembly. The deck sliding assembly can be used to slide the entire desk or a portion of the deck rearward to expose the area under the deck (the truck bed) or to create a working surface off the back of the system. In the preferred embodiment of the deck sliding assembly, the left and right extension arms 55, 65 and connected with a cross bar, which may include a handle, for simultaneously pulling out the extension arms 55, 65. The cross bar would also have a left and right flat or thin extension arms attached to the left and right end of the cross bar. The left and right flat extension arms are placed on the support rail lower edge 67 of the left and right support rail 50, 60 so that the edges of the deck panels 80, 80' rest on the flat extension arms of the deck sliding assembly. The flat extension arms can also incorporate one or more vertical risers which push against the deck boards 80, 80', or a portion of the deck 15, or the entire deck 15. When a user pulls the crossbar the extension arms 55, 65 of the system begin to extend and the flat extension arms (not shown) begin to slide along the ledge 68 of the left and right support rail 50, 60. The one or more vertical risers push against the deck boards 80, 80' and the deck 15, or a portion of the deck, begins to slide back beyond the rear support brace 70. When the deck 15 is pulled out beyond the rear support frame 70, the rear portion of the deck can be used as a work surface and the truck bed area below the deck 15 is exposed for easy access to the items below. The deck 15 can be returned back into position by pushing the cross bar and extension arms 55, 65 back into the system 10.

The system 10 and various parts of the system 10 can have varying or alternative designs and fastening mechanisms. In an alternative embodiment, instead of the clip 64 and clamp 33, 34 design the front and rear braces 20, 70 and the support rails 50, 60 could attach to the side frames 20, 30 using keyhole openings on the frames 20, 30 and buttons on the braces 20, 70 and rails 50, 60 where the buttons are inserted into the keyholes. The keyholes and buttons could be used on either mating part are the description of keyholes on the frames 20, 30 is for exemplary description only. In a further embodiment, the front and rear braces 20, 70 and the support rails 50, 60 could attach to the side frames 20, 30 using bolts and/or nuts or cotter pins.

The buttons and keyholes would be logically spaced to allow for adjusting the length and width of the system 10 and the height the rails 50, 60 are installed on the side frames 30, 40 to adjust the deck 15 height.

In a further exemplary embodiment, the deck support rail 50 and deck support rail 60 could be a fixed length (based on truck bed size) to provide or maintain a continuous lower ledge 68 for deck boards 80, 80' to be placed on. Since the vast majority (i.e., 95%+) of truck bed lengths are either 6 feet or 8 feet long, within given tolerances, the standard design of the system will accommodate varying widths, but fixed length support rails 50, 60. The fixed length support rails 50, 60 will mostly likely be 6 foot or 8 foot but could be provided in different lengths to accommodate the different truck bed sizes or other vehicle space sizes.

Alternatively, the top surface of the lower ledge 68 can employ slidable material allowing the plurality of extendable deck panels 80, 80' to slide and rest along the lower ledge 68. The deck panels 80, 80' could also include an edge strip on the lower surface of the ends of the panels 80, 80' used to assist with the sliding and gripping capability along the ledge 68. The slidable material or edge strip may be a Teflon like coating or similar material. The slidable material the deck panels 80, 80' to slide down the lower edge 68 as well as then to provide a friction grip and cushioning of the deck panels 80, 80', against the ledge 68.

In another exemplary embodiment, the side rails could use a sideways "U" shape instead of the "L" shaped configuration with the lower ledge 68. The sideways U-shaped design would allow the panels 80, 80' to be inserted into the sideways U and avoid the need to use the hook and loop materials.

In the preferred embodiment, the rack system 10 is made of a light weight, strong, durable, and weather resistant materials such as aluminum. Such aluminum pieces of the system 10 will likely be from extrusion. However, the system 10 could be made from steel, other alloys, plastic, composites or other suitable material. Further, the individual pieces could be painted or coated with a protective material.

For the purposes of this specification and any appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1%; from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although particular embodiments of the present invention have been described in detail for purposes of illustration, various modifications and enhancements may be made without departing from the spirit and scope of the present invention. Accordingly, the present invention is not to be limited except as by the appended claims.

With respect to the above description, it is to be realized that the optimum dimensional relationship for the various components of the invention described above and depicted in FIGS. 1 through 11 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A truck bed system comprising:
an extendable left side frame having a plurality of left side legs and a top left frame bar, wherein the left side legs have a plurality of clamp openings at varying heights along each left side leg;
an extendible right-side frame having a plurality of right side legs and a top right frame bar, wherein the right side legs have a plurality of clamp openings at varying heights along each right side leg providing a plurality of clamp openings;
an extendible front support assembly having a front left end double J hook clip and a front right end double J hook clip, wherein the left end double J hook clip mates with two left side leg clamp openings of the left side frame and the right end double J hook clip mates with two right side leg clamp openings of the right-side frame;
an extendible rear support assembly having a rear left end double J hook clip and a rear right end double J hook clip, wherein the left end double J hook clip mates with two left side leg clamp openings of the left side frame and the right end double J hook clip mates with two right side leg clamp openings of the right-side frame;
an extendible left support rail having a plurality of clips along the left side of the left support rail for inserting into the plurality of left side leg clamp openings on the extendable left side frame, wherein the extendible left support rail has a left rail ledge;
an extendible right support rail having a plurality of clips along the right side of the right support rail for inserting into the plurality of right side leg clamp openings on the extendable right side frame, wherein the extendible right support rail has a right rail ledge; and
a plurality of extendible deck boards for forming a deck, wherein the plurality of extendible deck boards having a left end and a right end wherein the left end is placed on the left rail ledge and the right end is placed on the right rail ledge.

2. The truck bed system of claim 1, wherein the extendible left support rail and the extendible right support rail each have an inner hollow opening.

3. The truck bed system of claim 2, wherein the extendible left support rail opening receives a left extension arm and the extendible right support rail opening receives a right extension arm.

4. The truck bed system of claim 1, wherein the deck height can be adjusted by mating the plurality of left side clips of the extendible left support rail with the plurality of left side leg clamp openings at varying heights and mating the plurality of right side clips of the extendible right support rail with the plurality of right side leg clamp openings at varying heights.

5. The truck bed system of claim 1, wherein the left end of each of the plurality of extendible deck panels attach to the left side rail edge and the right end of each of the plurality of extendible deck panels attach to the right side rail edge.

6. The truck bed system of claim 1, wherein the extendible left support rail and the extendible right support rail each has a plurality of stabilizers with each stabilizer located below each clip and each stabilizer has an extension which contacts at least one of the legs of the plurality of legs.

7. A truck bed system comprising:
an extendable left side frame having a plurality of left side legs and a top left frame bar, wherein the extendible left side frame has at least one upper left clamp element at a first height and at least one lower left clamp element at a second height;
an extendible right-side frame having a plurality of right side legs and a top right frame bar, wherein the extendible right side frame has at least one upper right clamp element at the first height and at least one lower right clamp at the second height;
an extendible front support assembly having a front left end and a front right end, wherein the front left end connects with the left side frame and the front right end connects with the right-side frame;
an extendible rear support assembly having a rear left end and a rear right end, wherein the rear left end connects with the left side frame and the rear right end connects with the right- side frame;
an extendible left support rail having at least one left clamp mating element for mating with the at least one upper left clamp element or the at least one lower left clamp element;
an extendible right support rail having at least one right clamp mating element for mating with the at least one upper right clamp element or the at least one lower right clamp element .

8. The truck bed system of claim 7, further comprising a plurality of extendible deck panels for forming a deck, wherein the plurality of extendible deck panels have a left end and a right end wherein the left end is placed on the extendible left support rail and the right end is placed on the extendible right support rail.

9. The truck bed system of claim 7, wherein the extendible left support rail and the extendible right support rail each have an inner hollow opening.

10. The truck bed system of claim 9, wherein the extendible left support rail opening receives a left extension arm and the extendible right support rail opening receives a right extension arm.

11. The truck bed system of claim 7, wherein the deck height can be adjusted by:
   mating the at least one right clamp mating element from the at least one upper right clamp element to the at least one lower right clamp element; and
   mating the at least one left clamp mating element with the at least one upper left clamp element to the at least one lower left clamp element.

12. The truck bed system of claim 7, wherein the extendible left support rail has a left rail ledge and the extendible right support rail has a right rail ledge.

13. The truck bed system of claim 12, wherein the left end of each of the plurality of extendible deck panels attach to the left side rail ledge and the right end of each of the plurality of extendible deck panels attach to the right side rail ledge.

14. The truck bed system of claim 7, wherein the extendible left support rail and the extendible right support rail each has at least one stabilizer which contacts at least one of the legs of the plurality of legs.

15. A method of manufacturing a truck bed system comprising the steps of:
   forming two extendible side frames by:
      connecting a top section of a first metal leg and a second metal leg to a first metal beam having a first hollow center;
      connecting at least one first lower clamping element to the first metal beam;
      connecting a first end of a first lower metal cross bar to the bottom of the first metal leg and a second end of the first lower cross bar to the bottom of the second metal leg;
      connecting a top section of a third metal leg and a fourth metal leg to a second metal beam having a second hollow center;
      connecting at least one second lower clamping element to the second metal beam;
      connecting a first end of a second lower metal cross bar to the bottom of a third metal leg and a second end of the second lower cross bar to the bottom of a fourth metal leg; and
      inserting a third beam into the first hollow center and the second hollow center;
   forming two support assemblies by:
      connecting a top end of a first vertical metal riser to a first end of a first top support beam having a hollow center;
      connecting a bottom end of the first vertical metal riser to a first end of a bottom support beam having a hollow center;
      connecting a top end of a second vertical riser to a first end of a second top support beam;
      connecting a bottom end of the second vertical riser to a first end of a second bottom support beam;
      inserting the second top support beam into the hollow center of the first top support beam;
      inserting the second bottom support beam into the hollow center of the first bottom support beam;
      attaching a first J-clamp element to the outside edge of the first vertical metal riser and a second J-clamp element to the outside edge of the second vertical metal riser;
   Ffrming two support rail assemblies by
      connecting at least one first upper clamping element to a first support rail beam having a hollow center, wherein the at least one first upper clamping element is configured to mate with the at least one first lower clamping element;
      connecting at least one second upper clamping element to a second support rail beam having a hollow center, wherein the at least one second upper clamping element is configured to mate with the at least one second lower clamping element; and
   Inserting a first end of an inner beam into the first support rail beam hollow center and a second end of an inner beam into the second support rail beam hollow center.

16. The method of manufacturing of claim 15, wherein the connection is by welding.

17. The method of manufacturing of claim 15, wherein the connection is by mechanical fasteners.

* * * * *